(12) United States Patent
Xu (10) Patent No.: US 11,029,506 B2
(45) Date of Patent: Jun. 8, 2021

(54) SCANNING MICROSCOPE WITH MULTIPLEXED LIGHT SOURCES

(71) Applicant: Coluxa Inc., Pleasanton, CA (US)

(72) Inventor: Heng Xu, Pleasanton, CA (US)

(73) Assignee: COLUXA INC., Pleasanton, CA (US)

( * ) Notice: Subject to any disclaimer, the term of this patent is extended or adjusted under 35 U.S.C. 154(b) by 0 days.

(21) Appl. No.: 16/390,992

(22) Filed: Apr. 22, 2019

(65) Prior Publication Data

US 2019/0324241 A1    Oct. 24, 2019

Related U.S. Application Data

(60) Provisional application No. 62/660,867, filed on Apr. 20, 2018.

(51) Int. Cl.
*G02B 21/00* (2006.01)

(52) U.S. Cl.
CPC ....... *G02B 21/0048* (2013.01); *G02B 21/006* (2013.01); *G02B 21/008* (2013.01); *G02B 21/0032* (2013.01); *G02B 21/0064* (2013.01)

(58) Field of Classification Search
CPC ............ G02B 21/0048; G02B 21/0032; G02B 21/0064; G02B 21/006; G02B 21/008; G02B 21/0076; G02B 21/00; G02B 21/0004; G02B 21/002; G02B 21/0024; G02B 21/0036; G02B 21/0052; G02B 21/06; G02B 21/18; G02B 21/36; G02B 21/361; G01N 2021/6419; G01N 21/6458; G01N 21/64; G01N 2021/6417; G01N 2021/6421; G01N 2021/6463; G01N 2021/6465

USPC ....... 359/362, 363, 368, 369, 372, 373, 385, 359/388, 390; 356/406, 407

See application file for complete search history.

(56) References Cited

U.S. PATENT DOCUMENTS

| 9,158,100 | B2 * | 10/2015 | Yokoi | ............... | G02B 21/0032 |
| 9,933,686 | B2 * | 4/2018 | Krishnamachari | .......................... | |
| | | | | | G02B 21/0064 |
| 2002/0085274 | A1 * | 7/2002 | Sasaki | .................... | G02B 21/16 |
| | | | | | 359/385 |
| 2004/0089816 | A1 | 5/2004 | Quake et al. | | |
| 2008/0013960 | A1 | 1/2008 | Tearney et al. | | |
| 2010/0182683 | A1 * | 7/2010 | Okugawa | ........... | G02B 21/0076 |
| | | | | | 359/389 |
| 2014/0070106 | A1 * | 3/2014 | Westphal | ............... | G02B 21/16 |
| | | | | | 250/368 |
| 2015/0077717 | A1 * | 3/2015 | Peng | .................. | G02B 27/1033 |
| | | | | | 353/31 |
| 2017/0199362 | A1 * | 7/2017 | Schwedt | ............ | G02B 21/0052 |

OTHER PUBLICATIONS

International Search Report and Written Opinion dated Jul. 30, 2019 for International Patent Application No. PCT/US19/28562 of Coluxa Inc., 8 pages.

* cited by examiner

*Primary Examiner* — Stephone B Allen
*Assistant Examiner* — Rahman Abdur
(74) *Attorney, Agent, or Firm* — Perkins Coie LLP (57) ABSTRACT

A scanning microscope multiplexes illumination light beams at different optical wavelengths (e.g., from different light sources) by placing illumination light beams non-coaxially to create separate focuses at specimen. Reflected or fluorescent light generated by the different illumination light beams is recorded simultaneously while scanning the specimen.

18 Claims, 5 Drawing Sheets

System overview of one example implementation

FIG 1: System overview of one example implementation

FIG.2A: Scanning design example 1

FIG. 2B: Scanning design example 2

FIG.3: An example of a beam scanning pattern on the specimen

FIG. 4: An example of a laser source unit that guides laser light from an external laser into the system in FIG. 1

FIG. 5: An example of a multispectral light detection unit

SCANNING MICROSCOPE WITH MULTIPLEXED LIGHT SOURCES

PRIORITY CLAIM AND RELATED APPLICATION

This patent document claims the priority and benefits of U.S. Provisional Patent Application No. 62/660,867 entitled "SCANNING MICROSCOPE WITH MULTIPLEXED LIGHT SOURCES" and filed by Applicant Coluxa Inc. on Apr. 20, 2018.

TECHNICAL FIELD

This patent document relates to optical devices and techniques for sensing or imaging applications including optical microscopes for imaging or examining biological tissue or cells.

BACKGROUND

In scanning microscopy, a specimen is scanned by a focused illumination beam multi-dimensionally and the reflected or fluorescent emitted light is recorded at focal spot locations to form an image. The relative movement of the illumination spot to the specimen can be used to scan the illumination beam across the specimen to image different parts of the specimen.

SUMMARY

The technology disclosed in this patent document can be used to provide scanning microscopy for imaging or examining biological tissue or cells and to implement multispectral illumination and processing of multispectral analysis. In implementations, reflected or fluorescent light from a specimen illuminated by illumination light at different illumination wavelengths (e.g., from different light sources such as continuous wave or CW lasers) is recorded simultaneously while scanning the illumination light across the specimen. For example, a scanning microscope can be constructed based on the disclosed technology to multiplex illumination light beams from two or more different light sources by placing the illumination light beams non-coaxially to create separate focuses at a specimen and the reflected or fluorescent light generated by the specimen from the different light sources is recorded simultaneously while scanning the specimen.

In one aspect, the disclosed technology can be implemented to provide a scanning optical microscope for optically interrogating a sample with probe laser light at different laser wavelengths. This scanning optical microscope includes different laser beam optical modules located to produce different probe laser beams respectively at different laser wavelengths which are combined into a combined probe laser beam bundle in which the different probe laser beams are directed to propagate along a common optical path yet with different beam propagation angles relative to one another; an optical beam routing device located in the common optical path of the combined probe laser beam bundle having the different probe laser beams and structured to include an optical input port to receive the combined probe laser beam bundle to redirect the combined probe laser beam bundle and a different optical output port; and an optical scanning device located to receive the combined probe laser beam bundle having the different probe laser beams and structured to include an actuator to cause a scanning of the combined probe laser beam bundle having the different probe laser beams to output the different probe laser beams with each being scanned over a scanning range while still being in different beam propagation angles relative to one another.

This scanning optical microscope includes a sample stage structured to include a sample surface for holding a sample to be optically interrogated by the different probe laser beams at the different laser wavelengths that are scanned over different locations of the sample by the optical scanning device; and a microscope objective lens placed in an optical path of the combined probe laser beam bundle having the different probe laser beams between the optical scanning device and the sample stage to focus the different probe laser beams onto the sample surface at different probe laser beam locations near or on the sample surface. Each probe laser beam at a respective laser wavelength excites generation in the sample of a corresponding fluorescent emission at different fluorescent emission wavelengths caused by laser light at the respective laser wavelength and the different probe laser beams at the different probe laser beam locations cause different fluorescent emissions in the sample at the different probe laser beam locations that are collected by the microscope objective lens as different collected fluorescent emission beams from the different probe laser beam locations at different fluorescent emission beam propagation angles to propagate to the optical scanning device which directs the different collected fluorescent emission beams at different fluorescent emission beam propagation angles to the optical beam routing device which outputs the different collected fluorescent emission beams at different fluorescent emission beam propagation angles at the optical output port as spatially separated different fluorescent emission beams at different fluorescent emission beam propagation angles.

This scanning optical microscope further includes a lens located to receive, from the optical output port of the optical beam routing device, the different fluorescent emission beams at different fluorescent emission beam propagation angles, and to focus the different fluorescent emission beams to different beam focus locations; different optical fibers located to have respective fiber end facets at the different beam focus locations by the lens, respectively, so that one fiber end facet of one optical fiber receives one of the different fluorescent emission beams; an different optical detection modules that are respectively coupled to the different optical fibers to receive the different fluorescent emission beams, one optical detection module for one fluorescent emission beam caused by one of the different probe laser beams, wherein each optical detection module includes an optical diffractive device to spatially separates different optical spectral components of a received fluorescent emission beam into different fluorescent emission spectral beams at different optical fluorescent emission wavelengths and an optical detector array of different optical detectors that respectively receive the different fluorescent emission spectral beams to produce different detector signals representing the different fluorescent emission spectral beams.

The above and other aspects and their implementations of the disclosed technology are described in greater detail in the drawings, the description and the claims.

DETAILED DESCRIPTION

Scanning microscopy can be used to obtain an image of a specimen by the relative movement of the illumination spot of illumination light on the specimen to image different parts of the specimen. Confocal laser scanning microscopy (CLSM) is one of the common forms of scanning microscopy. A laser scanning confocal microscope generally comprises a laser source, a controllable beam scanning or deflection device, spatial pinholes, dichroic filters, light detectors, and a microscope optical system. The laser output is collimated to form an illumination beam and is optically coupled and steered through the scanning optics to create a scanning focus spot onto the specimen. Reflected or fluorescent light coming from the specimen is collected by the microscope objective lens, and directed to the light detection system. In some implementations, the beam scanning device may be configured to include two oscillating mirrors whose titling axes are perpendicular to each other so that one scans along X direction point by point to form a line and the other scans across Y direction line by line in a raster fashion. For example, a galvanometer mirror is one type of commonly used scanning devices. A resonant mirror or polygon mirror can also be used to achieve beam scanning, usually at higher scanning speeds than that of a galvanometer mirror.

Fluorescent agents may be used to label the biological targets and such agents are selected to have distinct spectral characteristic for identifying different labeled targets. Choosing optimal excitation and emission wavelength band for imaging can be crucial to achieving a sufficiently high signal level at the optical detection and the quality of the detection result. In many applications, specimens are labeled with several fluorescent agents to identify different targets. Having a great selection of excitation and emission wavelength combinations is preferred for the multiplexing purpose. And how easily the selection can be accessed significantly affects the throughput.

In some CLSM designs, more than one laser source may be used so that laser beams from different laser sources at different laser wavelengths can be coupled together and aligned on a common optical axis to create overlapped focal spots on the specimen. The composition of the illumination light can be tuned by adjusting the individual intensity of laser sources or selecting interested wavelengths. The tuning speed limits the throughput. Slow moving mechanical parts are undesired for high throughout applications. In advanced CLSM, acousto-optic tunable filter (AOTF) may be used to control both the wavelength and intensity of illumination output on pixel base in a rapid manner. Various optical detection techniques may be used to separate fluorescent emission into optical signals at different wavelength bands for optical detection, such as optical interference, techniques, techniques by using one or more dichroic filters, one or more diffraction gratings, or one or more optical prisms. Each detector records one channel for selected emission band and different detectors are provided to detect different channels. Multiple channels can be constructed and recorded simultaneously.

The illumination beams from different laser sources are typically coupled and placed coaxial so that a common optical path for the illumination beams is formed. All the illumination light beams from different light sources are focused at the same spot on the specimen. The emission light resulted from different light sources is collected through a common optical path and then dispersed as different collected light beams in different wavelengths to be recorded in different detectors. The coaxial design of light beams simplifies the optic design by sharing optical path, however it also limits the multiplexing capability as all the different collected light beams are mixed together. Firstly fluorescence detection typically requires a dichroic filter that splits fluorescence emission from excitation light. Designing a dichroic filter that works for multiple excitation light sources is not just challenging but also unfavored due to reduced useable emission band for detection. Secondly, some fluorophore agents have broader absorption spectrum ranges and can be excited by other than the preferred illumination light source. This makes it harder to separate from other agents activated by those illumination light sources. Furthermore, the design of a highly multiplexed microscopy system can be difficult since the hardware capability and crosstalk between different signals need to be addressed in the system design. Therefore, in practice, different light sources are turned on sequentially to reduce the complexity of crosstalk. As a result, the number of agents can be detected simultaneously with coaxial light sources are very limited.

Laser scanning cytometry devices can be used to deploy similar coaxial designs of laser sources and to scan the focal spot by oscillating a mirror in the X direction and translating the specimen in the Y direction to form an image strip. Translating the specimen to cover a large area can be time-consuming, especially if repeating is required for a second laser.

In recognition of the above, the disclosed technology can be implemented to address those and other technical issues via specific implementations of the disclosed technology. In addition, the disclosed technology may be implemented in specific ways to improve the scalability, simplify the device design and increase the overall throughput.

For example, the disclosed technology can be used to construct a confocal laser scanning microscopy device that includes a plurality of laser light sources to produce laser beams at different laser wavelengths that are collimated and coupled using dichroic mirrors. The collimated beams are placed non-coaxially and slightly angled to each other in a plane that parallel to the pivot axis of a scanning mirror. In the forward light path, a beam splitter directs a portion of each laser beam to the scanning illumination system, and in the return path, a portion of the reflected laser beam and the fluorescent light are directed to the light detection system. Deflected laser beams are relayed to a microscope objective and then form a plurality of illumination focal spots on the specimen. A motorized stage moves the specimen in X direction while the deflecting mirror steers to scan the focal spots in Y direction. The combination provides a two-dimensional scan to the specimen. Reflected or fluorescent light generated at the specimen is collected by the microscope objective and travels back through the relay optics and the deflecting mirror to the beam splitter. The exit beams from the beam splitter are focused to an array of multimode fibers. Each fiber aperture coincides with the confocal spot of the corresponding laser beam. The fiber also acts as a pinhole to reject out of focus photons. Each fiber delivers collected photons to a multispectral detection unit which includes a plurality of photon detectors and are capable of recording the light intensity in a plurality of wavelength bands simultaneously. Each detection unit is optimized for the corresponding laser source/fluorescent light.

This confocal laser scanning microscopy device can include a data acquisition board that synchronizes the motion of the deflecting mirror and the stage, acquires and transfers data to the host computer which includes software to communicate with the data acquisition board and construct multi-spectral images for display and analysis.

The titling angel between two adjacent collimated laser beams are designed to provide adequate separation of focal spots so that the photons from one laser source spread into the other focal spot are negligible while staying close to allow more beams accommodated in the field of view.

A calibration step is performed to measure the pixel shift between different laser focuses, which is then used to align images excited by different laser sources.

One of the advantages of the disclosed technology is the improved scalability. By decoupling the focal spots of different laser sources, the detection optical paths for different laser sources become independent to each other. A dedicated detection unit therefore can be used for a specific laser source. Expansion of the system to support additional fluorescent agents is free of the constraint, i.e., the conflict of excitation and emission wavelength. Adding a channel to the detection unit or adding a laser source requires no architecture change. The detection unit is independent of other components and acts as a multi-spectral detector with fiber interface, and therefore it can be modularly designed to further improve the scalability.

Another feature of the disclosed technology is a constant throughput no matter how many laser sources are used. Since all the channels can be recorded in parallel, no rescan is needed. This feature is valuable in measurements that involve large area and multiple fluorescent targets.

The disclosed technology can be used to provide a consistent and straightforward workflow regardless what fluorescent agents are used. Users have more freedom to choose the fluorescent agents and design the measurement or imaging system.

Figure 1:
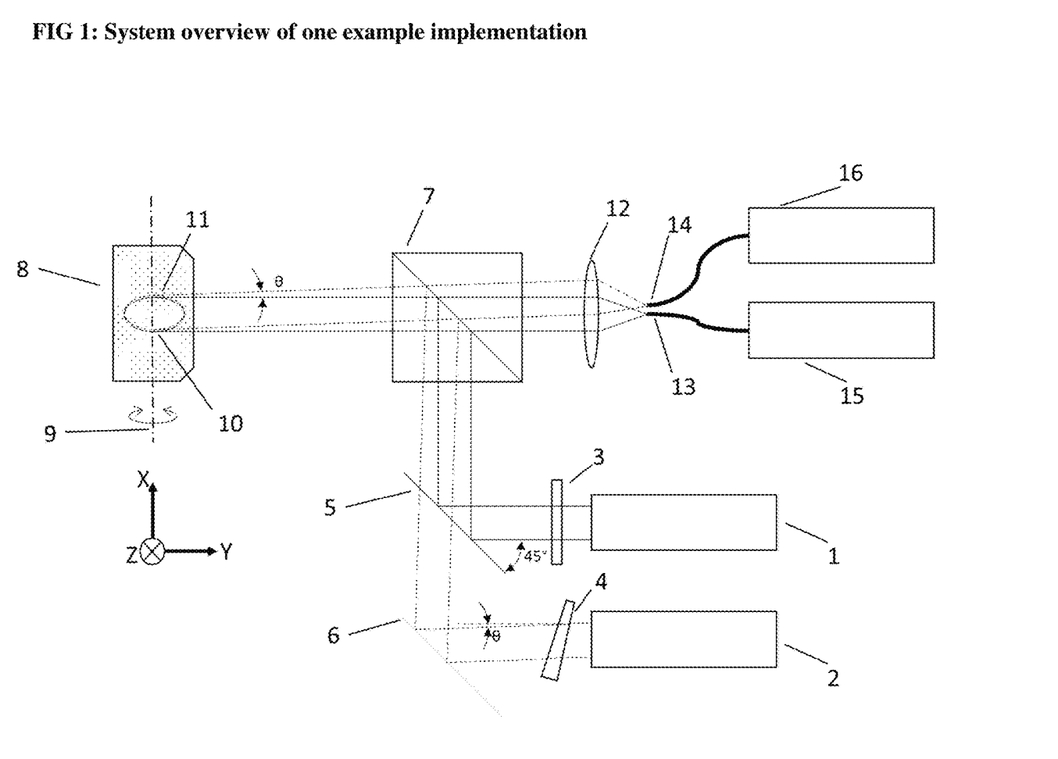
FIG. 1 shows an example of a schematic layout of a scanning microscope based on a plurality of laser source units and a plurality of detection units based on the disclosed technology.
Figure 2A:
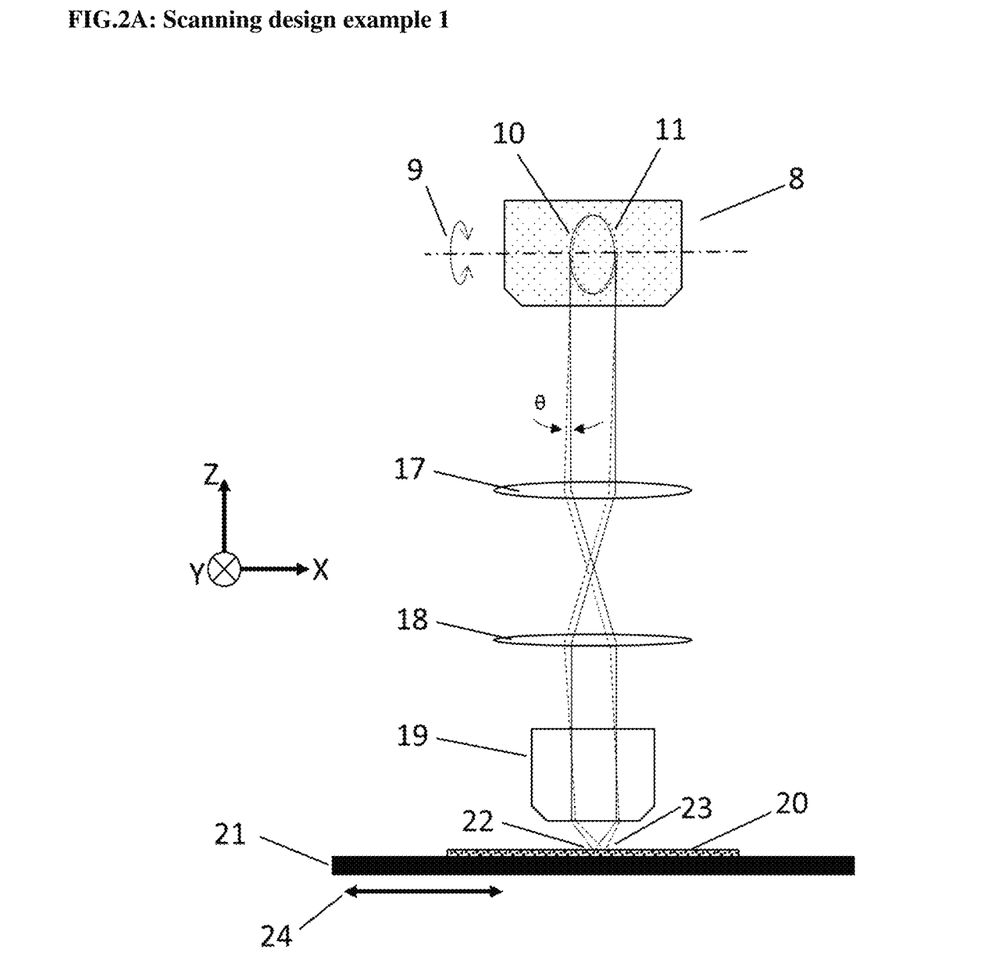
FIGS. 2A and 2B depict two examples of a microscopic scanning system for implementing the design in FIG. 1.
Figure 2B:
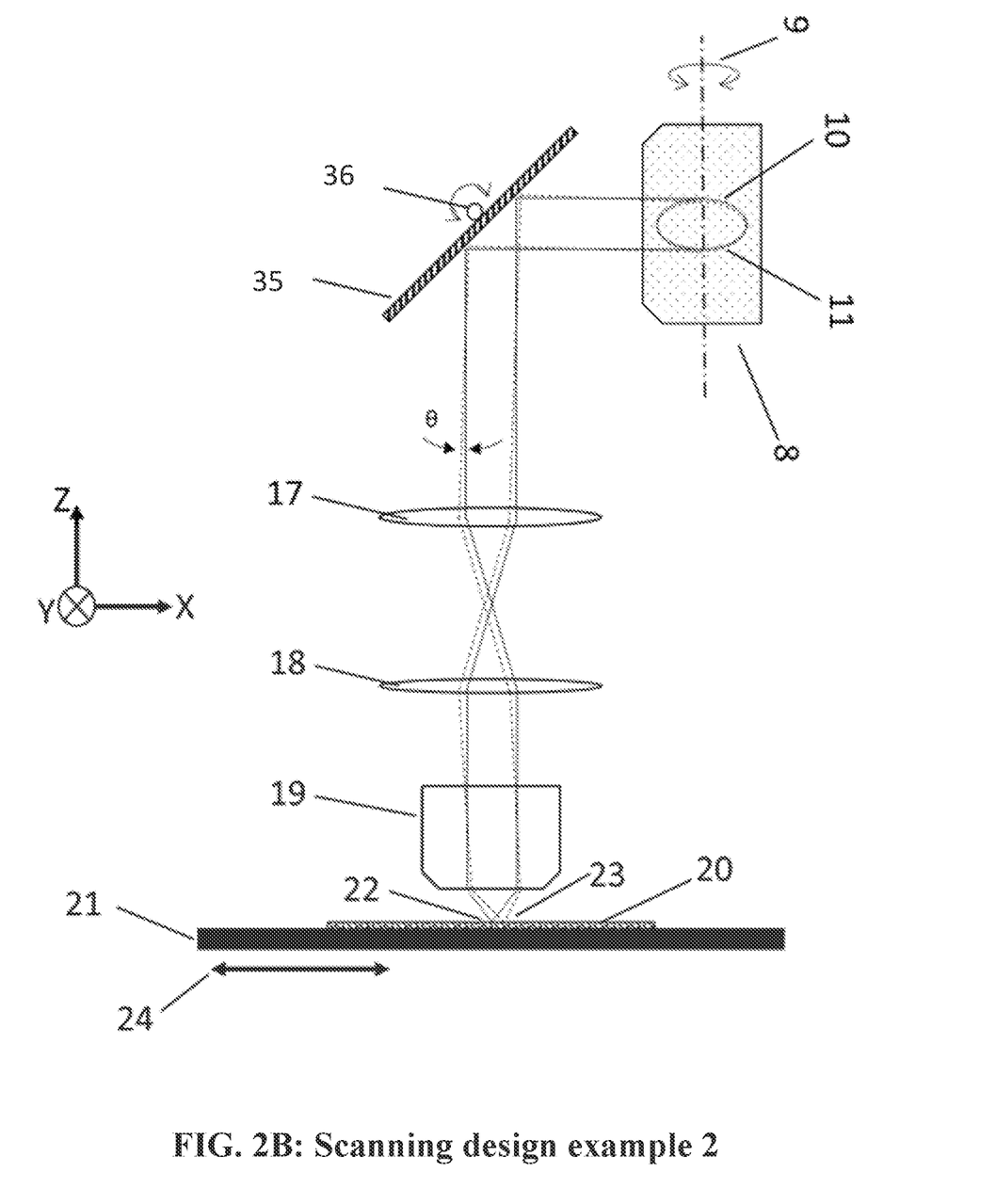

FIG. 1 and FIGS. 2A and 2B together schematically illustrate one implementation of a confocal scanning microscope with a plurality of laser sources (1, 2, . . . ) aligned non-coaxially. To better visualize the separation of the optical paths of different laser sources (1, 2, . . . ), the construction before the scanning mirror 8 is projected in XY plane shown in FIG. 1 and the construction after the scanning mirror 8 is projected in XZ plane shown in FIG. 2A or 2B.

The illustrated confocal scanning optical microscope includes different laser beam optical modules located to produce different probe laser beams respectively at different laser wavelengths which are combined into a combined probe laser beam bundle in which the different probe laser beams are directed to propagate along a common optical path yet with different beam propagation angles relative to one another; an optical beam routing device located in the common optical path of the combined probe laser beam. An optical beam routing device is provided and located in the common optical path of the combined probe laser beam bundle having the different probe laser beams and structured to include an optical input port to receive the combined probe laser beam bundle to redirect the combined probe laser beam bundle and a different optical output port.

As shown in FIG. 1, laser source modules 1 and 2 output two different collimated laser beams in different colors or at different laser wavelengths. In the example in FIG. 1, the optical beam routing device includes an input port with the optical elements 3 and 4 and an optical output port formed by the output of the optical element 7 and the dichroic reflectors 5 and 6 are also part of the optical beam routing device. In the illustrated example in FIG. 1, only two modules are shown for the simplicity. The first laser beam from the laser source module 1 goes through a glass plate 3 and then is deflected by a 45° dichromic mirror 5 that reflects light at the first laser wavelength from the laser source module 1 to a beam splitter 7 while transmitting the light at the second laser wavelength from the laser source module 2. The glass plate 3 can be rotated to introduce a displacement of the beam so that the beam center can be adjusted. The other laser beam, the second laser beam from the second laser source module 2 goes through a small angle prism 4 so that the exit beam is refracted a small angle θ from the entrance. In addition, the second laser beam can be displaced by rotating the prism 4. A 45° dichromic mirror 6 that reflects the light at the second laser wavelength deflects the angled beam from the laser source module 2 to the beam splitter 7. Each dichromic mirror is coated to reflect the corresponding laser line only and allows other wavelengths to pass through. The beam splitter 7 reflects a portion of the illumination beams to an optical scanning device and, in some implementations, dumps the transmitted light or uses the transmitted light to monitor the optical output of the laser sources.

The optical scanning device is located to receive the combined probe laser beam bundle having the different probe laser beams and structured to include an actuator to cause a scanning of the combined probe laser beam bundle having the different probe laser beams to output the different probe laser beams with each being scanned over a scanning range while still being in different beam propagation angles relative to one another. FIG. 1 shows a scanning mirror 8 as part of the optical scanning device. The scanning mirror 8 steers around a pivot along the X axis depicted by 9. The mirror surface of the scanning mirror 8 is placed at 45° to the XY plane when quiescent as shown in FIG. 1. And therefore, the circular laser beams intersect the mirror 8 with oval shape intersection depicted as 10 and 11. The laser module 2 is placed slightly offset to the dichromic mirror 6 in X direction so that the beam intersection 11 on the mirror 8 is aligned to the intersection 10. The returned beams travel back through the beam splitter 7 and then are focused by lens 12 to a series of multimode optical fibers 13 and 14. Each fiber collects the light excited by the corresponding laser module and then delivers to a multispectral detection unit 15 or 16.

FIGS. 2A and 2B show two optical scanning configurations as examples for implementing the design in FIG. 1 by using an objective lens to direct the scanning beam onto the specimen.

As shown in FIG. 2A, the scanning mirror 8 sends two collimated laser beams (slightly angled) through a telecentric scan lens 17 to create two focal spots in the back focal plane of the scan lens 17, called intermediate image plane, at every scan angle. When the scanning mirror 8 rotates its angle along X-axis, the two spots travel in the Y-direction in the intermediate image plane. A tube lens 18 is placed downstream from the scan lens 17 and an objective lens 19 is placed downstream from the tube lens 18 to relay the intermediate image to the specimen (20) plane, mounted on a positioning device such as a motorized translation stage 21. Marks 22 and 23 depict the focal spots of the two laser beams from the laser sources 1 and 2 on the specimen.

Figure 3:
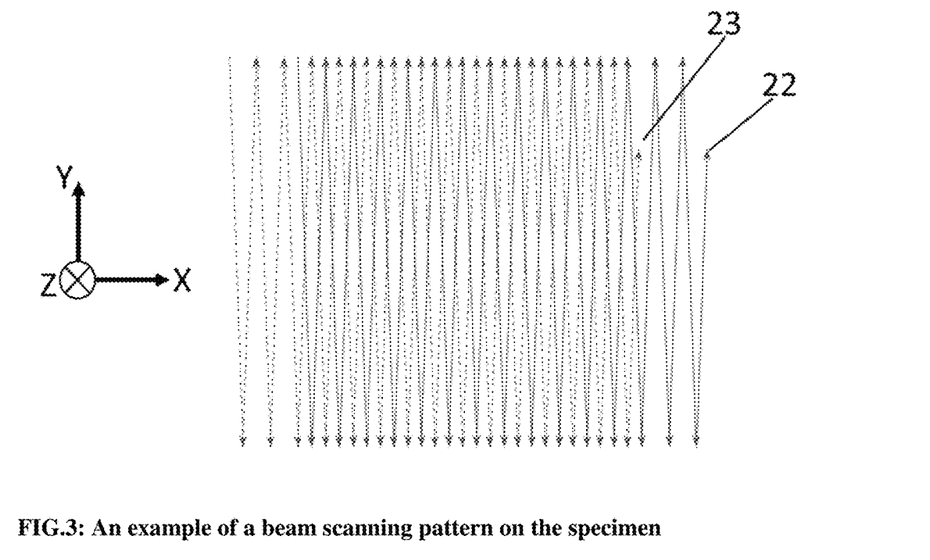
FIG. 3 illustrates an example of the scanning pattern of the focal spots on the specimen.

As the scanning mirror 8 steers around the pivot axis 9 along the X direction, the focal spots 22 and 23 sweep along the Y axis to form their respective scan lines on the specimen. Meanwhile, a positioning device such as a stage 21 carries the specimen and moves in the direction 24 along the X axis to accomplish a 2D scan on the specimen. The scanning pattern is shown in FIG. 3. There is a constant offset along X-direction between focal spots 22 and 23. Images generated by the two spots are aligned in software to account for the offset. Therefore, in the scanning configuration in FIG. 2A, the optical scanning is accomplished by both the scanning mirror 8 with a rotation actuator and the scanning stage 21 which includes a linear actuator to move the stage 21.

FIG. 2B shows a 2-dimensional optical scanning design using two reflectors 8 and 35 which are pivoted or rotated around two mutually perpendicular axes as part of the optical scanning device. The first reflector 8 (scanning mirror) pivots or rotates around the axis 9 along the Z direction and the second reflector 35 pivots or rotates around its axis 36 along the Y direction. On the other side of the first deflection mirror 8 shown in FIG. 2B, two angled beams are deflected by the second deflection mirror 35. The second mirror 35 steers along its axis 36 parallel to the Y direction. The mirror surface of the second deflection mirror 35 is placed at 45° to the XY plane when quiescent as shown in FIG. 2. The deflected beams from the second deflection mirror 35 are then directed through a tele-centric scan lens 17 to create a uniform spot size in the intermediate image plane at every scan angle. The incident angle at the entrance pupil of the scan lens 17 determines the position of the focal spot. Since the first deflection mirror 8 only tilts around the Z axis, the incident angle of the beam to the scan lens 17 only varies with respect to the Y axis but not to the X axis. And therefore, the focal spot only moves along Y axis when the deflection mirror 8 oscillates around its axis 9 in the Z direction when the second mirror 35 is fixed in its position or orientation. When the second mirror 35 pivots or oscillates around its axis 36 in the Y direction while the first mirror 8 is fixed in its position or orientation, the focal spot only moves along X axis. A tube lens 18 is positioned to collect and collimate the light from the two mirrors 8 and 35 and the scan lens 17. The collimated light output by the tube lens 18 is collected by a microscope objective 19 which brings the light to a focus on a specimen 22 mounted on a positioning device such as a motorized translation stage 21. Marks 22 and 23 depict the focal spots on the specimen formed by light from the laser sources 1 and 2.

As the deflection mirror 8 steers around the pivot 9, the focal spots 22 and 23 sweep along the Y axis to form the scan lines on the specimen. Meanwhile, either the deflection mirror 15 steers around the pivot 15 as shown in FIG. 2B or a stage 21 carries the specimen and moves in the direction 24 along the X axis a shown in FIG. 2A to accomplish a 2D scan of the illumination beams on the specimen. The scanning pattern is shown in FIG. 3. There is a constant spatial offset between focal spots 22 and 23. Images generated by the two spots 22 and 23 at two different laser wavelengths are aligned in software to account for the spatial offset.

Figure 4:
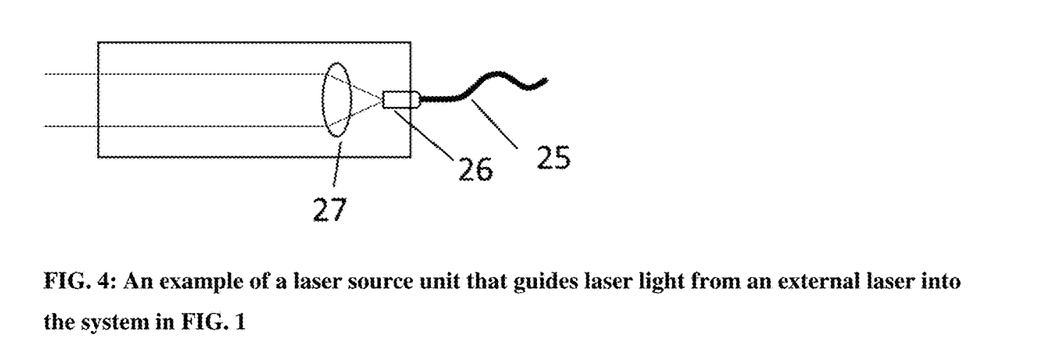
FIG. 4 depicts an example of a schematic construction of a laser source unit.

FIG. 4 illustrates an example of the schematic construction of a laser source module 1 or 2 in FIG. 1 based on one embodiment. A fiber 25 is provided to transport the laser light from a laser source such as a laser diode to a fiber connector or coupler 26 and the output laser light from the fiber connector 26 is collimated by a collimation lens 27 as the output to the optical element 3 or 4 in FIG. 1. The focal length of lens 27 is properly selected to make the beam size in a desired range.

Figure 5:
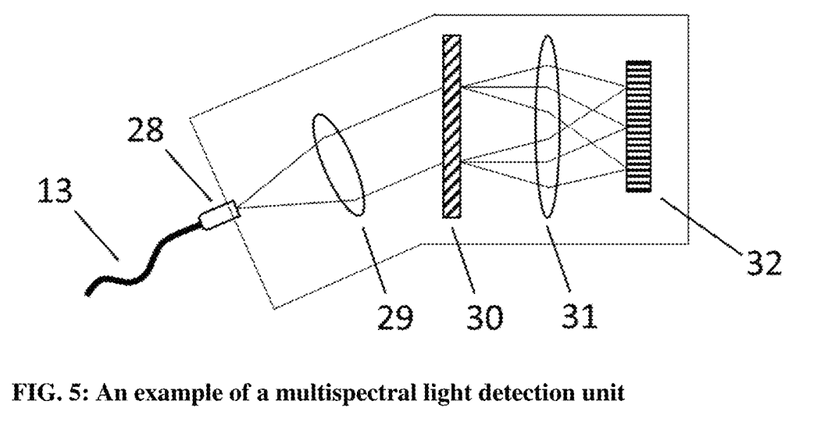
FIG. 5 depicts an example of a schematic construction of a multispectral light detection unit.

FIG. 5 illustrates an example of the schematic construction of a multispectral detection unit 15 or 16 in FIG. 1. A collection fiber 13 is mounted on the unit via a fiber connector or coupler 28 to receive the collected light for optical detection. A collimation lens 29 to collimate the collected light from the fiber connector 28, an optical grating 30 is provided downstream from the collimation lens 29 to disperse light in different colors or laser wavelengths into different light beams at different angles and along different optical paths. This spatially dispersed light signals output by the optical grating 30 are focused by a lens 31 to a photo detector array 32 of spatially spaced photodetectors which capture the incident light and produce detector signals to be processed.

The above disclosed technology can be implemented to provide a method for optically interrogating a sample with probe laser light at different laser wavelengths simultaneously. This method includes producing different probe laser beams respectively at different laser wavelengths as a combined probe laser beam bundle in which the different probe laser beams are directed to propagate along a common optical path yet with different beam propagation angles relative to one another; simultaneously focusing the different probe laser beams onto the sample at different probe laser beam locations so that each probe laser beam at a respective laser wavelength excites generation in the sample of a corresponding fluorescent emission at different fluorescent emission wavelengths caused by laser light at the respective laser wavelength and the different probe laser beams at the different probe laser beam locations cause different fluorescent emissions in the sample at the different probe laser beam locations; collecting the different fluorescent emissions in the sample at the different probe laser beam locations at different fluorescent emission beam propagation angles to focus the different fluorescent emissions to different beam focus locations; using different optical fibers located to have respective fiber end facets at the different beam focus locations, respectively, so that one fiber end facet of one optical fiber receives one of the different fluorescent emission beams; coupling different optical detection modules to the different optical fibers to receive the different fluorescent emission beams, respectively, one optical detection module for one fluorescent emission beam caused by one of the different probe laser beams; and, within each optical detection module for detection of fluorescent emission by the sample excited by one corresponding probe laser beam at a corresponding laser wavelength, spatially separating different optical spectral components of a received fluorescent emission beam into different fluorescent emission spectral beams at different optical fluorescent emission wavelengths for optical detection of fluorescent emission by the sample excited by the one corresponding probe laser beam at the corresponding laser wavelength.

In implementing the above method, signals from the different optical detection modules can be processed for detection of fluorescent emission by the sample excited by the different probe laser beams at the different laser wavelengths, respectively, and at the different probe laser beam locations in the sample to form a microscopic image of the sample based on the fluorescent emission by the sample by accounting for the effect of spatial offsets due to the different probe laser beam locations. Also, in implementations, each optical detection module for detection of fluorescent emission by the sample can be implemented by using an array of optical detectors to receive different fluorescent emission spectral beams at different optical fluorescent emission wavelengths, respectively, to measure an optical spectral property of fluorescent emission by the sample excited by the one corresponding probe laser beam at the corresponding laser wavelength.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is what is described and illustrated, including:

1. A scanning optical microscope for optically interrogating a sample with probe laser light at different laser wavelengths, comprising:
    different laser beam optical modules located to produce different probe laser beams respectively at different laser wavelengths which are combined into a combined probe laser beam bundle in which the different probe laser beams are directed to propagate along a common optical path yet with different beam propagation angles relative to one another;
    an optical beam routing device located in the common optical path of the combined probe laser beam bundle having the different probe laser beams and structured to include an optical input port to receive the combined probe laser beam bundle to redirect the combined probe laser beam bundle and a different optical output port;
    an optical scanning device located to receive the combined probe laser beam bundle having the different probe laser beams and structured to include an actuator to cause a scanning of the combined probe laser beam bundle having the different probe laser beams to output the different probe laser beams with each being scanned over a scanning range while still being in different beam propagation angles relative to one another;
    a sample stage structured to include a sample surface for holding a sample to be optically interrogated by the different probe laser beams at the different laser wavelengths that are scanned over different locations of the sample by the optical scanning device;
    a microscope objective lens placed in an optical path of the combined probe laser beam bundle having the different probe laser beams between the optical scanning device and the sample stage to focus the different probe laser beams onto the sample surface at different probe laser beam locations near or on the sample surface so that each probe laser beam at a respective laser wavelength excites generation in the sample of a corresponding fluorescent emission at different fluorescent emission wavelengths caused by laser light at the respective laser wavelength and the different probe laser beams at the different probe laser beam locations cause different fluorescent emissions in the sample at the different probe laser beam locations that are collected by the microscope objective lens as different collected fluorescent emission beams from the different probe laser beam locations at different fluorescent emission beam propagation angles to propagate to the optical scanning device which directs the different collected fluorescent emission beams at different fluorescent emission beam propagation angles to the optical beam routing device which outputs the different collected fluorescent emission beams at different fluorescent emission beam propagation angles at the optical output port as spatially separated different fluorescent emission beams at different fluorescent emission beam propagation angles;
    a lens located to receive, from the optical output port of the optical beam routing device, the different fluorescent emission beams at different fluorescent emission beam propagation angles, and to focus the different fluorescent emission beams to different beam focus locations;
    different optical fibers located to have respective fiber end facets at the different beam focus locations by the lens, respectively, so that one fiber end facet of one optical fiber receives one of the different fluorescent emission beams; and
    different optical detection modules that are respectively coupled to the different optical fibers to receive the different fluorescent emission beams, one optical detection module for one fluorescent emission beam caused by one of the different probe laser beams, wherein each optical detection module includes an optical diffractive device to spatially separates different optical spectral components of a received fluorescent emission beam into different fluorescent emission spectral beams at different optical fluorescent emission wavelengths and an optical detector array of different optical detectors that respectively receive the different fluorescent emission spectral beams to produce different detector signals representing the different fluorescent emission spectral beams.

2. The scanning optical microscope as in claim 1, wherein:
    the optical scanning device includes an optical reflector coupled to the actuator to cause the scanning of the combined probe laser beam bundle having the different probe laser beams.

3. The scanning optical microscope as in claim 1, wherein:
    the optical scanning device includes (1) an optical reflector coupled to the actuator to cause the scanning of the combined probe laser beam bundle having the different probe laser beams along a first scanning direction, and (2) a second optical reflector located to receive light from the optical reflector and coupled a second actuator to cause a scanning of the combined probe laser beam bundle having the different probe laser beams along a second scanning direction that is different from the first scanning direction.

4. The scanning optical microscope as in claim 1, further comprising:
a positioning device coupled to the sample stage to move a position of the sample stage relative to the combined probe laser beam bundle having the different probe laser beams that is scanned by the optical scanning device.

5. The scanning optical microscope as in claim 4, further comprising:
a tele-centric lens located between the positioning device and the microscope objective lens.

6. The scanning optical microscope as in claim 4, further comprising:
a tube lens located between the positioning device and the microscope objective lens.

7. The scanning optical microscope as in claim 4, further comprising:
a tele-centric lens located between the positioning device and the microscope objective lens; and
a tube lens located between the tele-centric lens the positioning device and the microscope objective lens.

8. The scanning optical microscope as in claim 1, wherein:
each of the different laser beam optical modules respectively located in the different probe laser beams includes an optical device that controls a direction of each probe laser beam so that the different laser beam optical modules respectively located in the different probe laser beams render the different probe laser beams are directed to propagate along a common optical path yet with the different beam propagation angles relative to one another.

9. The scanning optical microscope as in claim 8, wherein:
one of the different laser beam optical modules includes a transparent plate as the optical device that controls a direction of a corresponding probe laser beam.

10. The scanning optical microscope as in claim 8, wherein:
one of the different laser beam optical modules includes an optical prism as the optical device that controls a direction of a corresponding probe laser beam.

11. The scanning optical microscope as in claim 1, wherein:
one of the different laser beam optical modules includes a dichromic beam combiner.

12. The scanning optical microscope as in claim 1, wherein:
the optical beam routing device includes an optical beam splitter.

13. The scanning optical microscope as in claim 1, wherein:
each of the different optical fibers is a multi-mode optical fiber.

14. The scanning optical microscope as in claim 1, wherein the different laser beam optical modules include:
different lasers to produce the different probe laser beams at the different laser wavelengths, respectively;
laser delivery fibers coupled to the different lasers to receive the different probe laser beams, respectively; and
collimators located to collimate the different probe laser beams from the laser delivery fibers which are received by the different laser beam optical modules, respectively.

15. A method for optically interrogating a sample with probe laser light at different laser wavelengths, comprising:
simultaneously producing different probe laser beams respectively at different laser wavelengths as a combined probe laser beam bundle in which the different probe laser beams are directed to propagate along a common optical path yet with different beam propagation angles relative to one another;
simultaneously focusing the different probe laser beams onto the sample at different probe laser beam locations so that each probe laser beam at a respective laser wavelength excites generation in the sample of a corresponding fluorescent emission at different fluorescent emission wavelengths caused by laser light at the respective laser wavelength and the different probe laser beams at the different probe laser beam locations cause different fluorescent emissions in the sample at the different probe laser beam locations;
collecting the different fluorescent emissions in the sample at the different probe laser beam locations at different fluorescent emission beam propagation angles to focus the different fluorescent emissions to different beam focus locations;
using different optical fibers located to have respective fiber end facets at the different beam focus locations, respectively, so that one fiber end facet of one optical fiber receives one of the different fluorescent emission beams;
coupling different optical detection modules to the different optical fibers to receive the different fluorescent emission beams, respectively, one optical detection module for one fluorescent emission beam caused by one of the different probe laser beams; and
within each optical detection module for detection of fluorescent emission by the sample excited by one corresponding probe laser beam at a corresponding laser wavelength, spatially separating different optical spectral components of a received fluorescent emission beam into different fluorescent emission spectral beams at different optical fluorescent emission wavelengths for optical detection of fluorescent emission by the sample excited by the one corresponding probe laser beam at the corresponding laser wavelength.

16. The method as in claim 15, further comprising:
processing signals from the different optical detection modules for detection of fluorescent emission by the sample excited by the different probe laser beams at the different laser wavelengths, respectively, and at the different probe laser beam locations in the sample to form a microscopic image of the sample based on the fluorescent emission by the sample by accounting for the effect of the different probe laser beam locations to the formed microscopic image.

17. The method as in claim 15, further comprising:
in each optical detection module for detection of fluorescent emission by the sample, using an array of optical detectors to receive different fluorescent emission spectral beams at different optical fluorescent emission wavelengths, respectively, to measure an optical spectral property of fluorescent emission by the sample excited by the one corresponding probe laser beam at the corresponding laser wavelength.

18. The method as in claim 15, further comprising:
scanning the different probe laser beams over the sample to perform optical detection of the sample at different sample positions.

* * * * *